UNITED STATES PATENT OFFICE.

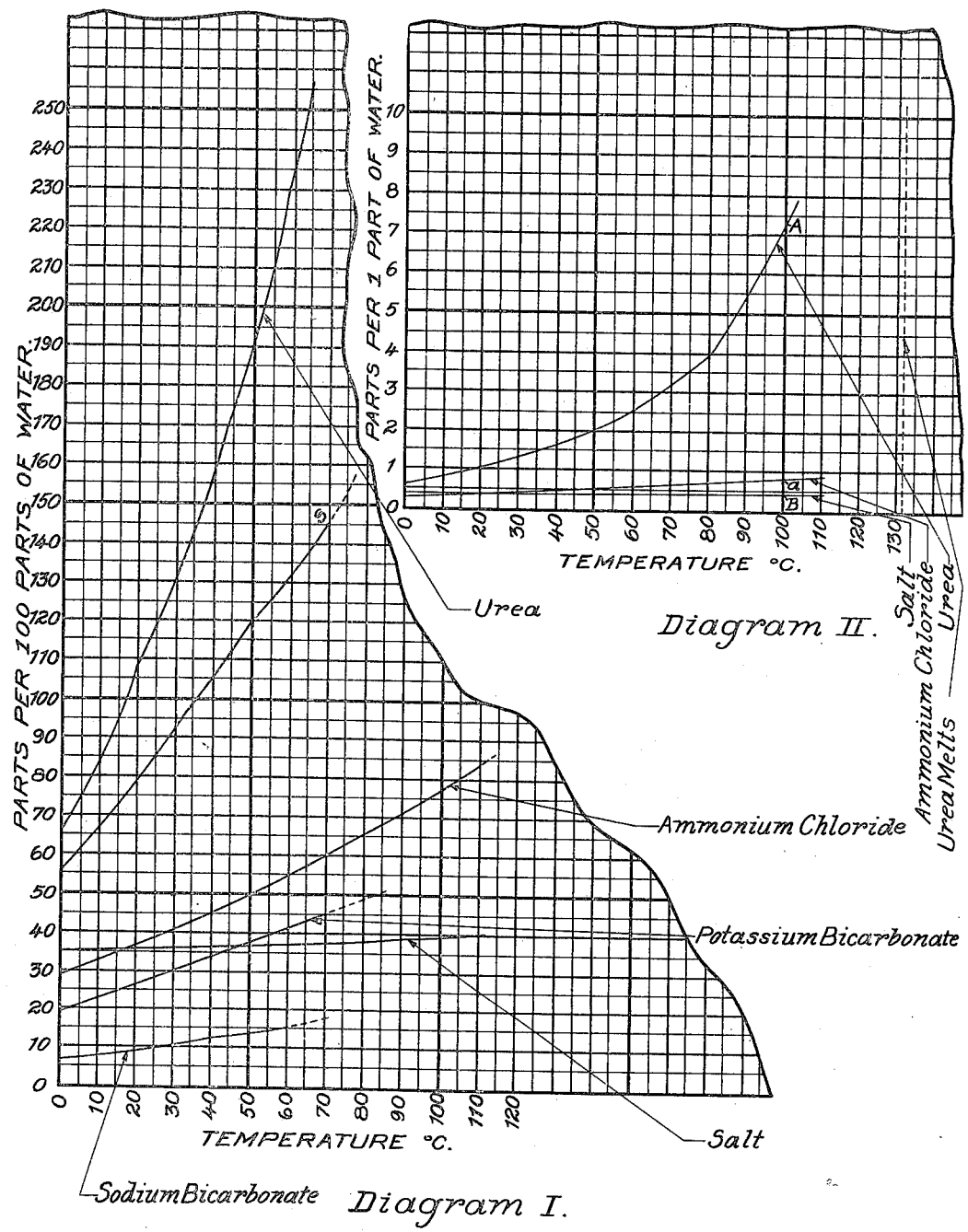

JOHN E. BUCHER, OF COVENTRY, RHODE ISLAND, ASSIGNOR TO NITROGEN PRODUCTS COMPANY, OF PROVIDENCE, RHODE ISLAND, A CORPORATION OF RHODE ISLAND.

PROCESS OF PRODUCING THE BICARBONATE OF AN ALKALI OR ALKALINE-EARTH METAL.

1,221,506.      Specification of Letters Patent.      Patented Apr. 3, 1917.

Application filed July 22, 1914. Serial No. 852,515.

*To all whom it may concern*.

Be it known that I, JOHN E. BUCHER, a citizen of the United States, residing at Coventry, in the county of Kent and State of Rhode Island, have invented certain new and useful Improvements in Processes of Producing the Bicarbonate of an Alkali or Alkaline-Earth Metal, of which the following is a specification.

The present invention relates in certain of its aspects to an improvement in what is commonly known as the ammonia-soda process.

In the course of the latter process acid ammonium carbonate is caused to react with common salt to form sodium bicarbonate and ammonium chlorid according to the equation:

(1) 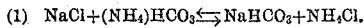

The reaction, it will be noted, is reversible and as a result, only part of the sodium chlorid is converted to the bicarbonate and in addition to this all of the acid sodium carbonate does not precipitate out, and considerable acid ammonium carbonate will be left in the solution.

It has been customary heretofore in order to effect a separation of the components resulting from the above reaction, to treat the ammonium chlorid with slaked lime to recover the ammonia; which latter is driven off by heat, to be re-used in the process.

This procedure involves a loss of not only the lime; but, further, the mother-liquors, thus obtained, generally contain at least one-third of the unchanged sodium chlorid.

Many attempts have been made to separate and recover these chlorids but they have been unsuccessful in most cases and the mother-liquors are usually thrown away, thus virtually wasting more than a third of the salt, all of the chlorin and all of the calcium participating in the process.

I have discovered that it is possible to so treat the components of the reaction set forth in equation 1, that not only is the waste of lime eliminated; but further substantially all of the chlorin is recovered to the process; practically the theoretical yield of bicarbonate may be obtained; and the separation of the reaction products being most readily effected while at the same time yielding the valuable diamid of carbonic acid,—urea.

One of the things which I have sought to do was to destroy the reversibility of equation 1, and this may be done by treating the reaction products, either before or after the partial separation of the bicarbonate from the mother-liquor, with, for example, sodium cyanate, thus:

(2) 

In the first half of this equation the acid sodium carbonate, may be in part in the form of a precipitate before the addition of the cyanate, unless such precipitated portion of said acid carbonate has previously been removed by filtration. The addition of the cyanate reduces the opposing effect of the ammonium salt and its ions, with the result that substantially all of the sodium bicarbonate is ultimately recovered; while the ammonium cyanate formed, of course, changes to urea upon standing and especially when gently heated.

After the precipitate has been removed the common salt and urea may be most readily separated by taking advantage of the differences in solubility of the urea at different temperatures.

In the accompanying diagrams which form parts hereof, I have shown graphically the solubility changes of several compounds.

Diagram I shows the relative solubilities of various substances at different temperatures, expressed as parts per 100 parts of water.

Diagram II similarly shows the solubilities in parts per one part of water.

The solubility of common salt changes but slightly for an increase in temperature of 40°, 80° or even 100° C., while the solubility of sodium bicarbonate is much less than that of salt and its solubility changes but moderately with temperature. The ammonium chlorid curve shows a much greater solubility change than is the case with salt but as compared with that of urea, this change is relatively moderate.

In working with urea, I found that the solubility of urea as given in Siedell's "*Solubilities of Inorganic and Organic Substances*," New York, 1907, page 344, represented by curve S, are far too low and they do not extend above 70° C.

Accordingly an approximate determination of the solubility of urea was made and showed the value at 70° C. to be about twice as great as that given in Siedell's Tables, while at 100° C., 1 part of water dissolved roughly 7½ parts of urea. These results show the solubility of urea to be very great even at 100° C. and to be increasing very rapidly with the temperature.

Diagram I gives the solubility of urea according to Siedell's Tables of Solubilities in the curve which I have marked S; while the curve marked "urea" gives about the true solubility. Room on the diagram permits only a part of this curve to be shown.

Diagram II gives a general idea of the solubility of urea as compared with those of salt and ammonium chlorid, and herein I have plotted parts of urea per 1 part of water so that the whole urea curve could be represented.

If the mixture to be separated is composed of ammonium chlorid and salt, it may be heated to, let us say, 100° C. and the water allowed to evaporate as long as pure salt separates out. This is then removed, a little water added, if desired, and the solution cooled to separate ammonium chlorid.

When a mixture of salt and urea is treated in the same way, a far more thorough separation of the components is obtained and the ratio of the lengths of lines AB, to *a*B enables us to make a partial estimate of the gain in efficiency when the nitrogenous substance is separated as urea rather than as ammonium chlorid and which temperature, 100° C. is the highest temperature employed; while at slightly higher temperatures the diagram shows still a greater difference between these lengths.

I have determined that it is even possible to proceed so far as to evaporate nearly all of the water and heat to, or substantially to, the melting point of the urea. Then the salt may be separated centrifugally or otherwise and nearly quantitatively, in one operation, from the urea since most of the sodium chlorid, especially if the crystals are large, is suspended in the solid phase in the liquid urea.

This procedure is especially efficacious if the separation be made quickly so that the urea does not decompose to any material extent, and I may here add that it is well to thus separate the components quickly even when working up to but 100° C. Also, if the urea be molten, and with but little or no water present, some of the sodium chlorid will dissolve therein, hence the advantage of having the latter coarsely crystalline and separating quickly.

In general, however, in so far as the above aspect of my invention is concerned, the use or cyanate in this improved ammonia soda process permits of the ready separation and recovery of the nitrogen product, in this case preferably urea, by crystallization of one or the other of the residues of the reaction (depending upon whether an alkaline or alkaline earth base is used, etc.) rather than by distillation of the ammonia, as has been the usual practice heretofore.

The common salt obtained by my process is purified and may be marketed to advantage as pure salt, or it may be returned to the process. It may be here noted also that the salt, being neutral, has no tendency to hydrolize the urea because of the formation of alkali carbonates, etc.

Sodium cyanate is sparingly soluble and it is better to heat slightly the mixture to which it is added, say to 60° C. and this may also be done under pressure to avoid the escape of gaseous products.

The nitrogenous carboxyl-containing compound,—acid ammonium carbonate,—used by preference in the process, may be added solid, or it may be formed in the process according to the equation:

(3) $NH_3 + CO_2 + H_2O = NH_4HCO_3$
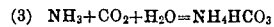

This process makes possible the separation of potassium bicarbonate from the nitrogenous compound; because while the ammonium salts and notably the chlorid, have solubilities very similar to those of potassium bicarbonate, as shown in the diagrams, the conversion of the quite soluble chlorid to the very much more soluble nitrogenous compound, urea, permits of a ready separation of the components by crystallization, in manner aforesaid.

This latter becomes of great value when a compound containing carbon united to nitrogen by a plurality of bonds, such as potassium carbonate is used for the fixation of nitrogen according to the process described in my Patent No. 1,091,425, dated March 24, 1914; since the carbonate can be regenerated from the bicarbonate in a manner analogous to the ammonia soda process, thus:

(4) $K_2CO_3 + N_2 + 4C = 2KCN + 3CO$
(5) $2KCN + O_2 = 2KCNO$
(6) $KCNO + NH_4HCO_3 = KHCO_3 + Urea.$
(7) $2KHCO_3 + heat = K_2CO_3 + H_2O + CO_2.$
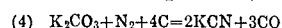
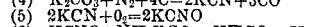
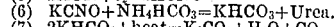
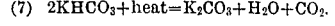

Hence, the process, while primarily an improvement in or over the commonly used ammonia soda process, is by no means to be regarded as being limited thereto; and in the appended claims the term "alkali metal" is to be regarded as of sufficient breadth to include all of those metals of the alkali and alkaline earth metal groups (such as barium) which are available for use in the process.

Finally in certain of the appended claims the expression "compound containing carbon united to nitrogen by a plurality of bonds", has been used, for want of a better to cover such cyanogen compound derivatives as the cyanates; there being some uncertainty as to just what is the actual structure of, for example, sodium cyanate.

Having thus described my invention what I claim is:—

1. An improved process for producing the bicarbonate of an alkali metal, which comprises reacting upon the chlorid of said metal with a nitrogenous acid carbonate and with an alkali metal compound containing carbon united to nitrogen by a plurality of bonds, to reform said chlorid of said metal and to form said bicarbonate and a nitrogenous compound which, at the temperature of the operation, is much more soluble than said chlorid of said metal.

2. An improved process for producing the bicarbonate of an alkali metal, which comprises reacting upon the chlorid of said metal with a nitrogenous acid carbonate and with an alkali metal compound containing carbon united to nitrogen by a plurality of bonds, to reform said chlorid of said metal and to form said bicarbonate and a nitrogenous compound which, at the temperature of the operation, is much more soluble than said chlorid of said metal, and separating said chlorid from said soluble nitrogenous compound, in part at least, by crystallization of one of said last two mentioned substances.

3. An improved process for producing the bicarbonate of an alkali metal, which comprises reacting upon the chlorid of said metal with a nitrogenous acid carbonate and with an alkali metal compound containing carbon united to nitrogen by a plurality of bonds, to reform said chlorid of said metal and to form said bicarbonate and a nitrogenous compound.

4. An improved process for producing the bicarbonate of an alkali metal, which comprises reacting upon a mineral acid salt of said metal with a nitrogenous acid carbonate and with an alkali metal compound containing carbon united to nitrogen by a plurality of bonds, to reform said salt and to form said bicarbonate and a nitrogenous compound, and separating said salt from said nitrogenous compound, in part at least, by crystallization of one of said last two mentioned substances.

5. An improved process for producing the bicarbonate of an alkali metal, which comprises reacting upon a mineral acid salt of said metal with a nitrogenous acid carbonate and with an alkali metal compound containing carbon united to nitrogen by a plurality of bonds, to reform said salt and to form said bicarbonate and urea.

6. An improved process for producing the bicarbonate of an alkali metal, which comprises reacting upon a mineral acid salt of said metal with a nitrogenous acid carbonate and with an alkali metal compound containing carbon united to nitrogen by a plurality of bonds, to reform said salt and to form said bicarbonate and a nitrogenous compound, heating the mixture of said salt and nitrogenous compound, after removing the bicarbonate, substantially to the melting point of said nitrogenous compound, and centrifugally separating said salt and compound.

7. An improved process for producing the bicarbonate of an alkali metal, which comprises reacting upon a mineral acid salt of said metal with a nitrogenous acid carbonate and with an alkali metal compound containing carbon united to nitrogen by a plurality of bonds, to reform said salt and to form said bicarbonate and a nitrogenous compound, heating the mixture of said salt and nitrogenous compound under pressure, after removing the bicarbonate, and separating said nitrogenous compound from said salt in part at least by crystallization of one of said last two mentioned substances.

8. An improved process for producing an alkali metal derivative of a carboxyl containing compound, which comprises effecting a reaction between an alkali metal salt and a carboxyl containing compound the base of which is ammonia, and separating the ammonium containing component of the reaction products from the alkali metal containing component of the same, said separation including converting said ammonium containing component to a diamid of greatly differing solubility from that of the alkali metal containing component.

9. An improved process for producing an alkali metal derivative of a carboxyl containing compound, which comprises effecting a reaction between an alkali metal salt and a carboxyl containing compound the base of which is ammonia, and separating the ammonium containing component of the reaction products from the alkali metal containing component of the same, said separation including converting said ammonium containing component to a diamid of greatly differing solubility from that of the alkali metal containing component and crystallizing said alkali metal component by temperature regulation while maintaining the liquid mass under pressure.

10. An improved process for producing an alkali metal derivative of a carboxyl containing compound, which comprises effecting a reaction between an alkali metal salt and a carboxyl containing compound the base of which is ammonia, and separating the ammonium containing component of the reaction products from the alkali metal containing component of the same, said separation including converting said ammonium containing component to a diamid of greatly differing solubility from that of the alkali metal containing component, crystallizing one of said two last mentioned substances and centrifugally separating one from the other.

In testimony whereof I have affixed my signature, in the presence of two witnesses.

JOHN E. BUCHER.

Witnesses:
NORMAN E. HOLT,
THOMAS H. ROBERTS.